(12) United States Patent
Nishikawa

(10) Patent No.: US 11,066,568 B2
(45) Date of Patent: Jul. 20, 2021

(54) DISPERSANT, DISPERSION AND INK COMPOSITION, AND PREPARING METHOD THEREOF

(71) Applicant: NISSIN CHEMICAL INDUSTRY CO., LTD., Echizen (JP)

(72) Inventor: Tomoyuki Nishikawa, Echizen (JP)

(73) Assignee: NISSIN CHEMICAL INDUSTRY CO., LTD., Echizen (JP)

( * ) Notice: Subject to any disclaimer, the term of this patent is extended or adjusted under 35 U.S.C. 154(b) by 224 days.

(21) Appl. No.: 16/381,341

(22) Filed: Apr. 11, 2019

(65) Prior Publication Data

US 2019/0330487 A1   Oct. 31, 2019

(30) Foreign Application Priority Data

Apr. 27, 2018   (JP) .............................. JP2018-086534

(51) Int. Cl.
  *C09D 11/38*   (2014.01)
  *C09D 11/037*   (2014.01)
  *C09D 11/328*   (2014.01)

(52) U.S. Cl.
  CPC ............ *C09D 11/38* (2013.01); *C09D 11/037* (2013.01); *C09D 11/328* (2013.01)

(58) Field of Classification Search
  CPC ...... C09D 11/38; C09D 11/037; C09D 11/328
  See application file for complete search history.

(56) References Cited

U.S. PATENT DOCUMENTS

| | | | | |
|---|---|---|---|---|
| 6,114,411 A * | 9/2000 | Nakamura | ............ | C09D 11/322 523/161 |
| 6,379,451 B1 | 4/2002 | Kitamura et al. | | |
| 6,916,862 B2 | 7/2005 | Ota et al. | | |
| 2006/0176349 A1 * | 8/2006 | Nagai | ................... | C09D 11/30 347/100 |
| 2010/0285287 A1 * | 11/2010 | Matsuyama | ........ | C09B 67/0033 428/207 |
| 2013/0087070 A1 * | 4/2013 | Itou | ....................... | C09D 11/18 106/31.28 |
| 2013/0340649 A1 * | 12/2013 | Ogura | .................... | C09D 11/18 106/31.25 |
| 2014/0017461 A1 * | 1/2014 | Matsuyama | ......... | C09D 11/322 428/207 |
| 2014/0065386 A1 * | 3/2014 | Matsuyama | ........... | C09D 11/36 428/207 |
| 2014/0072779 A1 * | 3/2014 | Matsuyama | ......... | C09D 11/322 428/195.1 |
| 2015/0040797 A1 * | 2/2015 | Itou | ...................... | C08K 5/3472 106/31.28 |
| 2016/0289475 A1 * | 10/2016 | Ito | .......................... | C09D 11/38 |
| 2017/0088734 A1 * | 3/2017 | Okumura | ............. | C09D 11/326 |
| 2018/0118961 A1 | 5/2018 | Nishikawa | | |

FOREIGN PATENT DOCUMENTS

| | | |
|---|---|---|
| JP | 8-127981 A | 5/1996 |
| JP | 2000-290578 A | 10/2000 |
| JP | 2002-20673 A | 1/2002 |
| JP | 2009-61649 A | 3/2009 |
| JP | 2009-67952 A | 4/2009 |
| JP | 2010-111826 A | 5/2010 |
| JP | 2011-174007 A | 9/2011 |
| JP | 2015-218232 A | 12/2015 |
| JP | 2016-175995 A | 10/2016 |
| JP | 2018-75559 A | 5/2018 |
| WO | 2014/156758 A1 | 10/2014 |

OTHER PUBLICATIONS

Offer of Information dated May 29, 2020, issued in counterpart JP Application No. 2018-86534. (4 pages).

* cited by examiner

*Primary Examiner* — John E Uselding
(74) *Attorney, Agent, or Firm* — Westerman, Hattori, Daniels & Adrian, LLP

(57) ABSTRACT

A dispersant, a dispersion and an ink composition including the dispersant, and a method of preparing the dispersion and the ink composition, in which the dispersant includes: (A) 0.5 to 30% by weight of a compound selected from at least one of acetylene glycol represented by the specific formula (1) and an ethoxylated substance of acetylene glycol represented by the specific formula (2); (B) 5 to 98% by weight of a nonionic aryl phenol compound represented by the specific formula (3); and (C) 1 to 70% by weight of an anionic aryl phenol compound represented by the specific formula (4), and wherein the total amount of components (A) to (C) is 100% by weight.

8 Claims, No Drawings

DISPERSANT, DISPERSION AND INK COMPOSITION, AND PREPARING METHOD THEREOF

CROSS-REFERENCE TO RELATED APPLICATION

This non-provisional application claims priority under 35 U.S.C. § 119(a) on Patent Application No. 2018-086534 filed in Japan on Apr. 27, 2018, the entire contents of which are hereby incorporated by reference.

TECHNICAL FIELD

The present invention particularly relates to a dispersant used for dispersing disperse dyes and pigments, and relates to a dispersion and an ink compositions, and a preparing method of the dispersion and the ink composition.

BACKGROUND ART

In the related art, disperse dyes and pigments have been used as colorants for inks. Including disperse dyes and pigments in ink requires dispersion of particulate disperse dyes and pigments in water. However, disperse dyes and pigments are insoluble in water. Accordingly, dispersants are important for keeping disperse dyes and pigments in a dispersed state and holding them stable for a long period of time. Nonionic surfactants, anionic surfactants, and polymer surfactants have been proposed as examples of such dispersants.

For example, Patent Document 1 and Patent Document 2 disclose that a nonionic surfactant including an acetylene group is useful as a pigment dispersant. However, a nonionic surfactant including an acetylene group is excellent in penetrability and anti-foamability of ink but tends to be inferior in dispersing performance to other dispersants. For example, the nonionic surfactant requires more time for dispersion than other dispersants.

Patent Document 3 discloses a pigment dispersion including two or more types of compounds selected from a sodium naphthalene sulfonate formalin condensate, polycarboxylic acid graft polymer, and polyoxyethylene styryl phenyl ether. Even in this case, a quantity of a dispersant added to a pigment is large, and there is room for improvement. Furthermore, using this dispersant for inkjet ink or the like requires addition of a wetting agent or a penetrating agent due to a tendency of the dispersant to cause foam.

As a dispersant for disperse dyes and pigments, the invention disclosed in Patent Document 4 employs a copolymer of styrene/acrylic acid/alkyl acrylate ester, the invention disclosed in Patent Document 5 employs a formalin condensate of naphthalene sulfonic acid, and the invention disclosed in Patent Document 6 employs a styrene/acrylic copolymer. However, using dispersants of such polymeric compounds causes a dispersion to have a high viscosity and causes difficulty in preparation. In addition, using those dispersants in an ink composition causes a disadvantage that the ink composition tends to dry easily. Furthermore, the invention disclosed in Patent Document 7 employs a nonionic surfactant represented by polyoxyalkylene alkyl ethers, but the surfactant does not have a satisfactory dispersing performance.

Still further, JP-A 2017-202274 filed by the applicants earlier (i.e. JP-A 2018-075559) discloses a dispersant including a compound selected from acetylene glycol and an ethoxylated substance of acetylene glycol, and an aryl phenol compound. Although the dispersant has a dispersing performance effective for red dyes, the dispersing performance is not satisfactory for dyes of other colors. Therefore, the development of a dispersant effective for any dye and pigment is in demand.

CITATION LIST

Patent Document 1: JP-A 2000-290578
Patent Document 2: JP-A 2002-020673
Patent Document 3: JP-A 2010-111826
Patent Document 4: WO 2014/156758
Patent Document 5: JP-A H08-127981
Patent Document 6: JP-A 2016-175995
Patent Document 7: JP-A 2011-174007
Patent Document 8: JP-A 2018-075559

SUMMARY OF THE INVENTION

The present invention has been made in light of the above circumstances, and an object of the present invention is to provide a dispersant which enables short-time dispersion of disperse dyes and pigments in small additive quantity, regardless of types of the disperse dyes and the pigments and which exhibits excellent wettability, and to provide a dispersion having excellent dispersion stability and an ink composition including the dispersant and the dispersion. Furthermore, an object of the present invention is to provide a preparing method of the dispersion and the ink composition.

As a result of intensive studies to achieve the above object, the present inventors have surprisingly found that using a dispersant that includes an acetylenic surfactant and at least two types of nonionic aryl phenol compounds and anionic aryl phenol compounds offers excellent dispersibility, wettability, and defoamability in small additive quantity and enables short-time dispersion time, thereby completing the present invention.

Accordingly, the present invention provides the following dispersant, dispersion and ink composition, and the following method of preparing the dispersion and the ink composition.

1. A dispersant including:
(A) 0.5 to 30% by weight of a compound selected from at least one of acetylene glycol represented by formula (1):

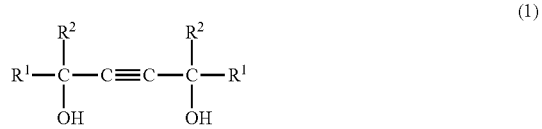

wherein $R^1$ and $R^2$ each represent a $C_1$-$C_5$ alkyl group, and
an ethoxylated substance of acetylene glycol represented by formula (2):

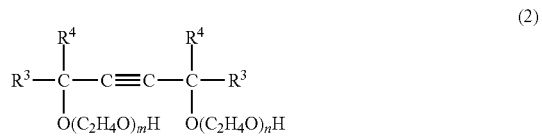

wherein $R^3$ and $R^4$ each represent a $C_1$-$C_5$ alkyl group, m and n each are a positive number of 0.5 to 25, and m+n is 1 to 40;

(B) 5 to 98% by weight of a nonionic aryl phenol compound represented by formula (3):

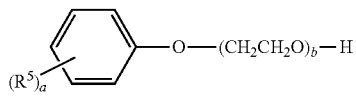

(3)

wherein a is an integer of 1 to 4, b is an integer of 1 to 30, and $R^5$ is an aryl group; and (C) 1 to 70% by weight of an anionic aryl phenol compound represented by formula (4):

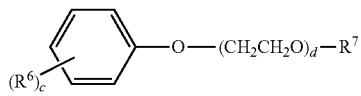

(4)

wherein c is an integer of 1 to 4, d is an integer of 1 to 30, $R^6$ is an aryl group, and $R^7$ is an anionic group, and wherein the total amount of components (A) to (C) is 100% by weight.

2. The dispersant according to 1 above, wherein $R^5$ and $R^6$ in formula (3) and formula (4) are a styryl, a benzyl, or a cumyl group.

3. The dispersant according to 1 above, wherein $R^7$ in formula (4) is a phosphate, a sulfonate, or a sulfate.

4. The dispersant according to 1 above, wherein the dispersant is used for dispersing a disperse dye or a pigment in an aqueous solvent.

5. A dispersion including a dispersant, a disperse dye and/or a pigment, and an aqueous solvent, wherein the dispersant is the dispersant according to 1 above.

6. An ink composition including the dispersion according to 5 above.

7. A method of preparing a dispersion, comprising mixing and dispersing of the dispersant according to 1 above, a disperse dye and/or a pigment, and an aqueous solvent.

8. A method of preparing an ink composition, the method involving:

mixing and dispersing of the dispersant according to 1 above, a disperse dye and/or a pigment, and an aqueous solvent to obtain a dispersion; and mixing of the dispersion with at least one kind of a substance selected from the group of water, a water-soluble organic solvent, resin, an ultraviolet absorber, an antioxidant, a pH adjuster, a preservative, and a viscosity modifier.

Advantageous Effects of the Invention

A dispersant according to the present invention enables dispersion of disperse dyes and pigments in small additive quantity, regardless of types of the disperse dyes and the pigments, and enables short-time dispersion. In addition, a dispersion and an ink composition including the dispersant enable excellent wettability and dispersion stability.

DESCRIPTION OF THE PREFERRED EMBODIMENTS

A dispersant according to an embodiment of the present invention includes a compound selected from at least one of acetylene glycol and an ethoxylated substance of acetylene glycol represented by formulae (1) and (2) (hereinafter referred to as "component (A)"); a nonionic aryl phenol compound (hereinafter referred to as "component (B)"); and an anionic aryl phenol compound (hereinafter referred to as "component (C)").

The acetylene glycol in the component (A) is represented by formula (1).

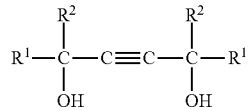

(1)

In formula (1), $R^1$ and $R^2$ each represent a $C_1$-$C_5$ alkyl group.

Examples of the acetylene glycol represented by formula (1) include 2,5,8,11-tetramethyl-6-dodecyne-5,8-diol, 5,8-dimethyl-6-dodecyne-5,8-diol, 2,4,7,9-tetramethyl-5-decyne-4,7-diol, 4,7-dimethyl-5-decyne-4,7-diol, 2,3,6,7-tetramethyl-4-octyne-3,6-diol, 3,6-dimethyl-4-octyne-3,6-diol, and 2,5-dimethyl-3-hexyne-2,5-diol.

The ethoxylated substance of acetylene glycol is represented by formula (2).

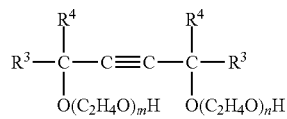

(2)

In formula (2), $R^3$ and $R^4$ each represent a $C_1$-$C_5$ alkyl group, m and n each are a positive number of 0.5 to 25, and m+n is 1 to 40.

Examples of the ethoxylated substance of acetylene glycol in formula (2) include ethylene oxide derivatives of the acetylene glycol such as an ethoxylated substance of 2,5,8,11-tetramethyl-6-dodecyne-5,8-diol (average of m+n: 6), an ethoxylated substance of 2,4,7,9-tetramethyl-5-decyne-4,7-diol (average of m+n: 10), an ethoxylated substance of 2,4,7,9-tetramethyl-5-decyne-4,7-diol (average of m+n: 4), and an ethoxylated substance of 3,6-dimethyl-4-octyne-3,6-diol (average of m+n: 4). The number of moles added in each ethylene oxide unit in formula (2) is preferably 0.5 to 25 mol, and the total number of moles added is preferably 1 to 40 mol. If the total number of moles added in the ethylene oxide exceeds 40 mol, the dispersant increases water solubility and increases foaming properties, which decreases defoaming effects.

The acetylene glycols in the component (A) may be used independently or in combination of two or more types. The component (A) having a mixing ratio of 0.5 to 30% by weight, and preferably, a mixing ratio of 1 to 20% by weight, of the whole dispersant is an important condition. If the component (A) has a mixing ratio less than 0.5% by weight, the dispersant deteriorates in wettability with respect to a disperse dye and a pigment, and if the component (A) has a mixing ratio over 30% by weight, the dispersant deteriorates in dispersibility of the disperse dye and pigment.

Next, the nonionic aryl phenol compound in the component (B) is represented by formula (3).

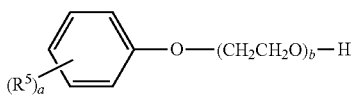
(3)

In formula (3), a is an integer of 1 to 4, b is an integer of 1 to 30, and $R^5$ is an aryl group.

Examples of the aryl group of $R^5$ include a styryl, a benzyl, a cumyl, a naphthyl, a phenyl, and a phenoxy group, and preferable examples are a styryl, a benzyl, and a cumyl group.

Specific examples of the nonionic aryl phenol compound represented by formula (3) include a styryl phenol compound such as polyoxyethylene monostyryl phenyl ether, polyoxyethylene distyryl phenyl ether, polyoxyethylene tristyryl phenyl ether, and polyoxyethylene tetrastyryl phenyl ether; a benzyl phenol compound such as polyoxyethylene monobenzyl phenyl ether, polyoxyethylene dibenzyl phenyl ether, and polyoxyethylene tribenzyl phenyl ether; a cumyl phenol compound such as polyoxyethylene cumyl phenyl ether; polyoxyethylene naphthyl phenyl ether; polyoxyethylene biphenyl ether; and polyoxyethylene phenoxy phenyl ether. These compounds may be used independently or in combination of two or more types. Preferable examples are polyoxyethylene distyryl phenyl ether, polyoxyethylene tristyryl phenyl ether, polyoxyethylene dibenzyl phenyl ether, polyoxyethylene tribenzyl phenyl ether, and polyoxyethylene cumyl phenyl ether. Herein, the repeating unit b of the polyoxyethylene group is an integer of 1 to 30, preferably, an integer of 15 to 30. The reason is that if b is an integer of 1 or more, the dispersant has excellent compatibility with an aqueous solvent or other additives and that if b is an integer of 30 or less, the dispersant has a moderate viscosity, and both cases are preferable.

Examples of the aryl phenol compound are described below. As the styryl phenol compound, the dispersant may employ, for example, commercially available products such as Noigen EA series produced by DKS Co. Ltd., and TS-2000, TS-2600, and SM-174N produced by Toho Chemical Industry Co., Ltd. As the benzyl phenol compound, the dispersant may employ, for example, a commercially available product such as Emulgen B-66 produced by Kao Corporation. As the cumyl phenol compound, the dispersant may employ a commercially available product such as Newcol CMP series produced by Nippon Nyukazai Co., Ltd.

The component (B) having a mixing ratio of 5 to 98% by weight, and preferably, a mixing ratio of 40 to 95% by weight, of the whole dispersant is an important condition. If the component (B) has a mixing ratio less than 5% by weight, the dispersant deteriorates in dispersibility of the disperse dye and pigment, and if the component (B) has a mixing ratio over 98% by weight, the dispersant deteriorates in wettability with respect to the disperse dye and pigment.

The anionic aryl phenol compound in the component (C) is represented by formula (4).

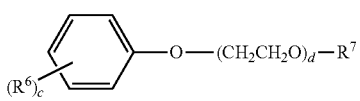
(4)

In formula (4), c is an integer of 1 to 4, d is an integer of 1 to 30, $R^6$ is an aryl group, and $R^7$ is an anionic group.

Examples of the aryl group of $R^6$ include a styryl, a benzyl, a cumyl, a naphthyl, a phenyl, and a phenoxy group, and preferable examples are a styryl, a benzyl, and a cumyl group. The anionic group of $R^7$ is preferably a phosphate, a sulfonate or a sulfate.

Specific examples of the anionic aryl phenol compound represented by formula (4) include a styryl phenol compound such as a phosphate, a sulfonate, and a sulfate of polyoxyethylene monostyryl phenyl ether, a phosphate, a sulfonate, and a sulfate of polyoxyethylene distyryl phenyl ether, a phosphate, a sulfonate, and a sulfate of polyoxyethylene tristyryl phenyl ether, and a phosphate, a sulfonate, and a sulfate of polyoxyethylene tetrastyryl phenyl ether; a benzyl phenol compound such as a phosphate, a sulfonate, and a sulfate of polyoxyethylene monobenzyl phenyl ether, a phosphate, a sulfonate, and a sulfate of polyoxyethylene dibenzyl phenyl ether, and a phosphate, a sulfonate, and a sulfate of polyoxyethylene tribenzyl phenyl ether; a cumyl phenol compound such as a phosphate, a sulfonate, and a sulfate of polyoxyethylene cumyl phenyl ether; a phosphate, a sulfonate, and a sulfate of polyoxyethylene naphthyl phenyl ether; a phosphate, a sulfonate, and a sulfate of polyoxyethylene biphenyl ether; and a phosphate, a sulfonate, and a sulfate of polyoxyethylene phenoxy phenyl ether. These compounds may be used independently or in combination of two or more types. Preferable examples are a phosphate, a sulfonate, and a sulfate of polyoxyethylene distyryl phenyl ether, and a phosphate, a sulfonate, and a sulfate of polyoxyethylene tristyryl phenyl ether. Specifically, preferred are polyoxyethylene distyryl phenyl ether phosphoric ester, polyoxyethylene tristyryl phenyl ether phosphoric ester, polyoxyethylene distyryl phenyl ether ammonium sulfate, polyoxyethylene tristyryl phenyl ether ammonium sulfate, polyoxyethylene distyryl phenyl ether sodium sulfate, and polyoxyethylene tristyryl phenyl ether sodium sulfate. Herein, the repeating unit d of the polyoxyethylene group is an integer of 1 to 30, preferably, an integer of 15 to 30. The reason is that if d is an integer of 1 or more, the dispersant has excellent compatibility with an aqueous solvent or other additives and that if d is an integer of 30 or less, the dispersant has a moderate viscosity, and both cases are preferable.

Examples of the anionic aryl phenol compound are described below. As the styryl phenol compound, the dispersant may employ, for example, commercially available products such as Hitenol NF series, and Plysurf AL series produced by DKS Co. Ltd., SM-210 produced by Toho Chemical Industry Co., Ltd., and Dispersogen series produced by Clariant Japan KK.

The component (C) having a mixing ratio of 1 to 70% by weight, and preferably, a mixing ratio of 3 to 60% by weight, of the whole dispersant is an important condition. If the component (C) has a mixing ratio less than 1% by weight, the dispersant deteriorates in dispersibility of the disperse dye and pigment, and if the component (C) has a mixing ratio over 70% by weight, the dispersant may cause more foam.

The dispersant according to an embodiment of the present invention is yielded by mixing the component (A), the component (B), and the component (C) by a known mixing method with a propeller stirrer or the like. In this case, if a solid component is used at room temperature, the mixture may be subjected to heat mixing as appropriate.

A dispersion according to an embodiment of the present invention includes the dispersant, a disperse dye and/or pigment, and aqueous solvent.

Components of the dispersion are described below.

In the dispersion according to an embodiment of the present invention, the dispersant preferably has a mixing ratio of 1 to 100 parts by weight, more preferably, 3 to 50 parts by weight, and still more preferably, 5 to 20 parts by weight per 100 parts by weight of the disperse dye and pigment. With too small a mixing ratio, the dispersant has a difficulty in sufficiently dispersing the disperse dye and pigment, and with too large a mixing ratio, the dispersion contains large amount of the dispersant not adsorbed by the disperse dye and pigment, and both cases are not preferable.

The disperse dye is not particularly limited and may be a known disperse dye. Disperse dyes are categorized into chemical structures of benzene azo type (monoazo, disazo), heterocyclic azo type (such as thiazole azo, benzothiazole azo, pyridone azo, pyrazolone azo, and thiophene azo), anthraquinone type, condensed type (such as quinophthalone, styryl, and coumarin). Being free of water-soluble group, disperse dyes are hardly soluble in water and have a molecular weight of 2,000 or less which is smaller than that of other dyes.

Examples of the disperse dye preferably employed in an embodiment of the present invention are described below.

The dispersion may preferably employ yellow dyes such as C.I. Disperse Yellow 3, 4, 5, 7, 9, 13, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 114, 116, 118, 119, 122, 124, 126, 135, 140, 141, 149, 160, 162, 163, 164, 165, 179, 180, 182, 183, 186, 192, 198, 199, 202, 204, 210, 211, 215, 216, 218, 224;

orange dyes such as C.I. Disperse Orange 1, 3, 5, 7, 11, 13, 17, 20, 21, 25, 29, 30, 31, 32, 33, 37, 38, 42, 43, 44, 45, 47, 48, 49, 50, 53, 54, 55, 56, 57, 58, 59, 61, 66, 71, 73, 76, 78, 80, 89, 90, 91, 93, 96, 97, 119, 127, 130, 139, 142;

red dyes such as C.I. Disperse Red 1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 277, 278, 279, 281, 288, 289, 298, 302, 303, 310, 311, 312, 320, 324, 328;

purple dyes such as C.I. Disperse Violet 1, 4, 8, 23, 26, 27, 28, 31, 33, 35, 36, 38, 40, 43, 46, 48, 50, 51, 52, 56, 57, 59, 61, 63, 69, 77;

green dyes such as C.I. Disperse Green 6: 1, 9;

brown dyes such as C.I. Disperse Brown 1, 2, 4, 9, 13, 19, 21, 27;

blue dyes such as C.I. Disperse Blue 3, 7, 9, 14, 16, 19, 20, 26, 27, 35, 43, 44, 54, 55, 56, 58, 60, 62, 64, 71, 72, 73, 75, 79, 81, 82, 83, 87, 91, 93, 94, 95, 96, 102, 106, 108, 112, 113, 115, 118, 120, 122, 125, 128, 130, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 267, 268, 270, 284, 285, 287, 288, 291, 293, 295, 297, 301, 315, 330, 333, 359, 360; and black dyes such as C.I. Disperse Black 1, 3, 10, 24.

Preferable examples in dyes produced by Nippon Kayaku Co. Ltd. include Kayaset Black K-R, A-N, Kayalon Polyester Black S-200, EX-SF 300, G-SF, BR-SF, 2B-SF 200, TA-SF 200, AUL-S, Kayaset Yellow K-CL, Kayalon Polyester Yellow 4G-E, Kayalon Polyester Light Yellow 5G-S, Kayaset Red K-BL, Kayacelon Red E-BF, SMS-5, SMS-12, Kayalon Polyester Red TL-SF, BR-S, BL-E, HL-SF, 3BL-5200, AUL-S, Kayalon Polyester Light Red B-5200, Kayalon Polyester Rubine BL-5200, Kayaset Blue N, K-FL, MSB-13, Kayalon Polyester Blue BR-SF, T-S, Kayalon Polyester Light Blue BGL-5200, Kayalon Polyester Turq Blue GL-5200, and Kayalon Polyester Blue Green FCT-S.

Preferable examples in dyes produced by Orient Chemical Industries Co. Ltd. include Valifast Black 3806, 3810, 3820, Oil Black BS, BY, B-85, 860, Water Yellow 6C, Valifast Yellow 1101, 1105, 3110, 3120, 4120, 4126, Oplas Yellow 130, 140, Oil Yellow GG-S, 105, 107, 129, 818, Water Red 27, Valifast Red 1306, 1355, 2303, 3311, 3320, Valifast Orange 3210, Valifast Brown 2402, Oil Red 5B, Oil Pink 312, Oil Brown BB, Valifast Blue 1601, 1603, 1605, 2606, 3806, 3820, Oil Blue #15, #613, 613, N14, and BOS.

Preferable examples in dyes produced by Sumitomo Chemical Co., Ltd. include Sumikaron Black S-BL, S-BF extra conc., S-RPD, S-XE 300%, Sumikaron Yellow SE-4G, SE-5G, SE-3GL conc., SE-RPD, Sumikaron Brilliant Flavine S-10G, Sumikaron Red E-FBL, E-RPD(E), S-RPD(S), Sumikaron Brilliant Red S-BF, S-BLF, SE-BL, SE-BGL, SE-2BF, SE-3BL(N), Sumikaron Red E-FBL, E-RPD(E), S-RPD(S), Sumikaron Brilliant Red S-BF, S-BLF, SE-BL, SE-BGL, SE-2BF, SE-3BL(N), Sumikaron Brilliant Blue S-BL, Sumikaron Turquoise Blue S-GL, and S-GLFgrain.

Preferable examples in dyes produced by BASF include Basacryl Black X-BGW, NaozaponBlack X-51, X-55, Neozapon Yellow 081, Lurafix Yellow 138, Zapon Blue 807, Neozapon Blue 807, Lurafix Blue590, 660, Orasol Black RLI, RL, CN, Oracet Yellow 8GF, GHS, Orasol Red G, Oracet Pink RP, Orasol Blue GL, GN, and 2R.

Preferable examples in dyes produced by Taoka Chemical Co., Ltd. include Oleosol Fast Black AR, RL, Oleosol Fast Pink FB, Rhodamine A, B, B gran., Oleosol Fast Yellow 2G, and Oleosol Fast Blue ELN.

Preferable examples in dyes produced by Hodogaya Chemical Co., Ltd. include Spilon Black BNH and MH special.

Preferable examples in dyes produced by Mitsui Chemicals, Inc include PS Yellow GG, MS Yellow HD-180, PS Red G, and MS Magenta VP.

A preferable example in dyes produced by Bayer includes Ceres Blue GN 01.

Preferable examples in dyes produced by Sumika Color Co. Ltd. include TS Yellow 118 cake, ESC Yellow 155, Sumiplast Yellow HLR, GC, TS Turq Blue 618, 606, ESC Blue 655, 660, Sumiplast Blue S, and OA.

The pigment is not particularly limited and may be a known pigment. Examples of the organic pigment include azo pigments such as soluble azo pigments, insoluble azo pigments, and condensed azo pigments; polycyclic pigment such as quinacridone pigments, perylene pigments, perinone pigments, isoindolinone pigments, isoindoline pigments, dioxazine pigments, thioindigo pigments, anthraquinone pigments, quinophthalone pigments, metal complex pigments, and diketopyrrolopyrrole pigments; and phthalocyanine pigments. Examples of the inorganic pigment include carbon black, metal oxide, metal hydroxide, metal sulfide, metal ferrocyanide, and metal chloride. Examples of carbon black include furnace black, lamp black, acetylene black, and channel black.

Specific examples of the pigment include red pigments such as C.I. Pigment Red 7, 9, 14, 41, 48: 1, 48: 2, 48: 3, 48: 4, 81: 1, 81: 2, 81: 3, 122, 123, 146, 149, 168, 177, 178, 179, 187, 200, 202, 208, 210, 215, 224, 254, 255, 264;

yellow pigments such as C.I. Pigment Yellow 1, 3, 5, 6, 14, 55, 60, 61, 62, 63, 65, 73, 74, 77, 81, 93, 97, 98, 104, 108, 110, 128, 138, 139, 147, 150, 151, 154, 155, 166, 167, 168, 170, 180, 188, 193, 194, 213;

orange pigments such as C.I. Pigment Orange 36, 38, 43;

blue pigments such as C.I. Pigment Blue 15, 15: 2, 15: 3, 15: 4, 15: 6, 16, 22, 60;

green pigments such as C.I. Pigment Green 7, 36, 58;

purple pigments such as C.I. Pigment Violet 19, 23, 32, 50; and black pigments such as C.I. Pigment Black 7.

Among these examples, C.I. Pigment Red 122, C.I. Pigment Yellow 74, 128, 155, C.I. Pigment Blue 15: 3, 15: 4, 15: 6, C.I. Pigment Green 7, 36, C.I. Pigment Violet 19, C.I. Pigment Black 7 are preferably employed.

The type, particle size, treatment, and the like of the disperse dye and/or pigment included in the dispersion are appropriately selected depending on the intended use. The disperse dye and pigment included in the dispersion may be used independently or in combination of two or more types.

It is preferred that the disperse dye and pigment in the dispersion have a concentration of from 1 to 50% by weight, more preferably, from 5 to 50% by weight per 100% by weight of the dispersion. If the disperse dye and pigment have a concentration over 50% by weight, the disperse dye and pigment in the dispersion increase in density, and they are prevented from moving freely, which may cause agglomeration.

Examples of the aqueous solvent include water and/or a water-soluble organic solvent, and two or more types may be mixed to be used. In regard to water, pure water or ion exchanged water (deionized water) are preferable. Examples of the water-soluble organic solvent include alcohols such as methyl alcohol, ethyl alcohol, n-propyl alcohol, isopropyl alcohol, n-butyl alcohol, sec-butyl alcohol, and tert-butyl alcohol; glycols such as ethylene glycol, propylene glycol, dipropylene glycol, butylene glycol, triethylene glycol, 1,2, 6-hexanetriol, thiodiglycol, hexylene glycol, and diethylene glycol; glycol ethers such as ethylene glycol monomethyl ether, ethylene glycol monoethyl ether, diethylene glycol methyl ether, diethylene glycol ethyl ether, triethylene glycol monomethyl ether, triethylene glycol monoethyl ether, and triethylene glycol monobutyl ether; polyhydric alcohols such as glycerin; and nitrogen-containing compounds such as N-methyl-2-pyrrolidone, 2-pyrrolidone, and 1,3-dimethyl-2-imidazolidinone. The proportion of water and the water-soluble organic solvent in the dispersion is preferably from 5 to 95% by weight, more preferably, from 30 to 90% by weight per 100% by weight of the dispersion.

In regard to a method of preparing a dispersion according to an embodiment of the present invention, it is particularly preferred that the method involve mixing and dispersing of the dispersant, disperse dye and/or pigment, and aqueous solvent. For example, a dispersion is obtained by mixing the dispersant, disperse dye and/or pigment, and aqueous solvent, using a mixing and dispersing machine such as a paint shaker, beads mill, ball mill, dissolver, and kneader. Furthermore, if a solid component is used at room temperature, the mixture may be subjected to heat mixing as appropriate.

The dispersion desirably has a viscosity of 10.0 mPa·s or less, more desirably, 5.0 mPa·s or less. The lower limit of the viscosity in the dispersion is desirably 1.0 mPa·s or more. The viscosity in this case is the condition at 25° C.

The disperse dye and/or pigment in the dispersion desirably have a mean particle size of 500 nm or less, more desirably, 250 nm or less, and still more desirably, 150 nm or less, depending on the type of the disperse dye and/or pigment. The mean particle size herein represents the median diameter (D50).

The dispersion desirably has surface tension of 50 mN/m or less, more desirably, 45 mN/m or less.

An ink composition according to an embodiment of the present invention includes the dispersion of the present invention, and optionally includes resin and other additives. In other words, the ink composition according to an embodiment of the present invention preferably includes the following (i) to (v):

(i) a dispersant;

(ii) a disperse dye and/or pigment;

(iii) water and/or a water-soluble organic solvent;

(iv) resin; and (v) one or two or more additives selected from the group of an ultraviolet absorber, an antioxidant, a pH adjuster, a preservative, and a viscosity modifier.

It is preferred that the disperse dye and/or pigment in the ink composition have a concentration of from 0.1 to 20% by weight, more preferably, from 0.1 to 10% by weight per 100% by weight of the ink composition.

The proportion of water and/or the water-soluble organic solvent in the ink composition is preferably from 50 to 99% by weight, more preferably, from 60 to 95% by weight per 100% by weight of the ink composition.

The resin included in the ink composition is preferably a polymer having a hydrophobic group and a hydrophilic group. As the hydrophobic group, this polymer preferably has at least one functional group selected from an alkyl group, a cycloalkyl group, and an aryl group. As the hydrophilic group, this polymer preferably has at least one functional group selected from a carboxy group, a sulfo group, a hydroxy group, an amino group, an amide group, and functional groups thereof. Such a polymer is obtained, for example, by polymerizing monomers or oligomers having a functional group such as an acryloyl group, a methacryloyl group, a vinyl group, and an allyl group. Specifically, the polymer may be obtained by employing a compound having an acryl group or a methacryl group, for example, (meth) acrylates such as (mono, di, tri, tetra, poly) ethylene glycol di(meth)acrylate, 1,4-butanediol, 1,5-pentanediol, 1,6-hexanediol, 1,8-octanediol, and 1,10-decanediol, trimethylolpropane tri(meth)acrylate, glycerin (di, tri) (meth)acrylate, di(meth)acrylates of ethylene oxide adduct of bisphenol A or F, neopentyl glycol (meth)acrylate, pentaerythritol tetra(meth)acrylate, and dipentaerythritol hexa(meth)acrylate in a case of introducing a bridged structure as well as a monofunctional compound such as styrene, tetrahydrofurfuryl acrylate, butyl methacrylate, (a, 2, 3, or 4)-alkyl styrene, (a, 2, 3, or 4)-alkoxystyrene, 3,4-dimethyl styrene, a-phenyl-styrene, divinylbenzene, vinylnaphthalene, dimethylamino (meth)acrylate, dimethylaminoethyl (meth)acrylate, dimethylaminopropyl acrylamide, N, N-dimethylaminoethyl acrylate, acryloyl morpholine, N, N-dimethyl acrylamide, N-isopropyl acrylamide, N,N-diethylacrylamide, methyl (meth) acrylate, ethyl (meth)acrylate, propyl (meth)acrylate, ethylhexyl (meth)acrylate, other alkyl (meth)acrylate, methoxydiethyleneglycol (meth)acrylate, (meth)acrylates of diethyl glycol or polyethylene glycol of an ethoxy group, a propoxy group, and a butoxy group, cyclohexyl (meth) acrylate, benzyl (meth)acrylate, phenoxyethyl (meth)acrylate, isobornyl (meth)acrylate, hydroxyalkyl (meth)acrylate, and other fluorine-containing, chlorine-containing, and silicon-containing (meth)acrylates, (meth)acrylamides, maleic amides, and (meth)acrylates.

The proportion of the resin in the ink composition is not particularly limited, but is preferably from 0 to 30% by weight, more preferably, from 0 to 20% by weight per 100% by weight of the ink composition. Also, in mixing resin in the ink composition, the resin is preferably 1% by weight or more.

The ink composition may include other various additives. Examples of the additives include an ultraviolet absorber, an antioxidant, a pH adjuster, a preservative, and a viscosity modifier, which may be appropriately selected and mixed in the ink composition. With a proportion of 0 to 10% by weight, these additives may be added to the dispersion and the remainder of 100% by weight of the ink composition excluding the disperse dye and/or pigment, water and/or water-soluble organic solvent, and resin, specifically, 100% by weight of the ink composition.

A method of preparing an ink composition is not particularly limited, but the method preferably involves: mixing and dispersing of the dispersant, a disperse dye and/or a pigment, and an aqueous solvent to obtain a dispersion; and mixing of the dispersion with a substance selected from at least one of water, a water-soluble organic solvent, resin, an ultraviolet absorber, an antioxidant, a pH adjuster, a preservative, and a viscosity modifier.

The ink composition is applied to a recording medium by an inkjet recording method, by a recording method using a writing instrument such as a pen, or by other printing methods. It is particularly preferable that the ink composition according to an embodiment of the present invention is used for an ink jet recording system.

EXAMPLES

The following Examples, Reference Examples and Comparative Examples are provided to illustrate the present invention although the present invention is not limited to the following Examples. In the following Examples, "parts" and "%" represent "parts by weight" and "% by weight", respectively.

Example 1

A plastic container (made from polypropylene, volume 0.5 L) was filled with 15 parts of PS Red G (produced by Mitsui Chemicals, Inc., C.I. Disperse Red 60) as a red disperse dye, 83.35 parts of ion-exchanged water and 0.1 parts of dipropylene glycol as aqueous solvents, 0.05 parts of a compound (A-1) as the component (A), 1.3 parts of a compound (B-1) as the component (B), 0.2 part of a compound (C-1) as the component (C), and 300 parts of zirconia beads (diameter 0.3 mm), and the mixture was dispersed for 5 hours with using Paint Shaker (produced by Asada Iron Works Co., Ltd.). After dispersion, the zirconia beads were separated by filtration to obtain a dispersion.

Examples 2 to 20, Reference Example, and Comparative Examples 1 to 6

A dispersion of each example of formulations shown in Tables 1 to 3 was prepared in a manner similar to Example 1.

The components (A) and (B) shown in Tables 1 to 3 are described in detail a follows.
(A-1): 2,5,8,11-tetramethyl-6-dodecyne-5,8-diol
(A-2): an ethoxylated substance of 2,4,7,9-tetramethyl-5-decyne-4,7-diol (average of m+n in formula (2) is 4)
(A-3): an ethoxylated substance of 2,5,8,11-tetramethyl-6-dodecyne-5,8-diol (average of m+n in formula (2) is 4)
(B-1): a styryl phenol compound in which $R^5$ in formula (3) is a styrene group, a value is 3, and b value is 23
(B-2): a styryl phenol compound in which $R^5$ in formula (3) is a styrene group, a value is 3, and b value is 17
(B-3): a styryl phenol compound in which $R^5$ in formula (3) is a styrene group, a value is 3, and b value is 28
(B-4): a styryl phenol compound in which $R^5$ in formula (3) is a styrene group, a value is 2, and b value is 17
(B-5): a benzyl phenol compound in which $R^5$ in formula (3) is a benzyl group, a value is 3, and b value is 15

The component (C) and the disperse dye shown in Tables 1 to 3 are described in detail as follows.
(C-1): a styryl phenol compound in which $R^6$ in formula (4) is a styrene group, $R^7$ is ammonium sulfate, c value is 3, and d value is 23
(C-2): a styryl phenol compound in which $R^6$ in formula (4) is a styrene group, $R^7$ is a phosphate ester, c value is 2, and d value is 12
(DR-60): C.I. Disperse Red 60
(DY-54): C.I. Disperse Yellow 54
(DB-60): C.I. Disperse Blue 60
(DB-359): C.I. Disperse Blue 359
(DB-360): C.I. Disperse Blue 360
(DBr-27): C.I. Disperse Brown 27

A viscosity, a mean particle size, and surface tension of each dispersion were measured by the following method. The results are shown in Table 1.

(Viscosity)

With using a TVE-20E type viscometer (produced by Toki Sangyo Co., Ltd.), a viscosity (25° C.) of each dispersion was measured immediately after dispersion and after storage at 60° C. for one week. A dispersion with a viscosity unchanged after the one-week storage at 60° C. has better stability.

A rate of change (%) of viscosity was calculated by the following formula. The smaller the rate of change, the better the stability, and a preferable rate of change is 40 or less.

Rate of change (%)=[(Viscosity after one-week storage at 60° C.−Viscosity immediately after dispersion)/Viscosity immediately after dispersion]×100

(Mean Particle Size)

With using a fiber-optics particle analyzer with autosampler FPAR-1000 (produced by Otsuka Electronics Co., Ltd.), a mean particle size (D50) of each dispersion was measured immediately after dispersion and after storage at 60° C. for one week. A dispersion having a particle size unchanged after the one-week storage at 60° C. is better.

A rate of change (%) of particle size was calculated by the following formula. The smaller the rate of change, the better the stability, and a preferable rate of change is 40 or less.

Rate of change (%)=[(Mean particle size after one-week storage at 60° C.−Mean particle size immediately after dispersion)/Mean particle size immediately after dispersion]×100

(Surface Tension)

With using a DY-500 high-precision surface tensiometer (produced by Kyowa Interface Science Co., Ltd.), static surface tension of each dispersion was measured immediately after dispersion and after storage at 60° C. for one week. A dispersion with surface tension unchanged after the one-week storage at 60° C. is better.

A rate of change (%) of static surface tension was calculated by the following formula. The smaller the rate of change, the better the stability, and a preferable rate of change is 10 or less.

Rate of change (%)=[(Static surface tension after one-week storage at 60° C.−Static surface tension immediately after dispersion)/Static surface tension immediately after dispersion]×100

TABLE 1

| Component mixing ratio (parts by weight) | | Example | | | | | | | | | |
|---|---|---|---|---|---|---|---|---|---|---|---|
| | | 1 | 2 | 3 | 4 | 5 | 6 | 7 | 8 | 9 | 10 |
| Component (A) | A-1 | 0.05 | 0.05 | 0.05 | 0.05 | 0.05 | 0.05 | 0.05 | 0.05 | 0.05 | 0.05 |
| | A-2 | | | | | | | | | | |
| | A-3 | | | | | | | | | | |
| Component (B) | B-1 | 1.3 | 1.3 | 2.6 | 2.6 | 2.6 | 1.3 | 1.3 | 1.3 | 2.6 | 2.6 |
| | B-2 | | | | | | | | | | |
| | B-3 | | | | | | | | | | |
| | B-4 | | | | | | | | | | |
| | B-5 | | | | | | | | | | |
| Component (C) | C-1 | 0.2 | 0.2 | 0.4 | 0.4 | 0.4 | 0.2 | | | | |
| | C-2 | | | | | | | 0.2 | 0.2 | 0.4 | 0.4 |
| Disperse dye | DR-60 | 15 | | | | | | 15 | | | |
| | DY-54 | | 15 | | | | | | 15 | | |
| | DB-60 | | | 15 | | | | | | 15 | |
| | DB-359 | | | | 15 | | | | | | 15 |
| | DB-360 | | | | | 15 | | | | | |
| | DBr-27 | | | | | | 15 | | | | |
| Aqueous solvent | Water | 83.35 | 83.35 | 81.85 | 81.85 | 81.85 | 83.35 | 83.35 | 83.35 | 81.85 | 81.85 |
| | Dipropylene glycol | 0.1 | 0.1 | 0.1 | 0.1 | 0.1 | 0.1 | 0.1 | 0.1 | 0.1 | 0.1 |
| Viscosity (mPa · s) | Immediately after dispersion | 1.8 | 1.8 | 1.8 | 3.0 | 2.0 | 1.7 | 1.8 | 1.7 | 1.7 | 3.4 |
| | 60° C. × One week | 1.8 | 1.8 | 2.0 | 2.6 | 1.9 | 1.6 | 1.9 | 1.6 | 1.8 | 4.5 |
| | Rate of change (%) | 0 | 0 | 11 | -13 | -5 | -6 | 6 | -6 | 6 | 32 |
| Mean particle size (nm) | Immediately after dispersion | 131 | 93 | 195 | 183 | 127 | 102 | 133 | 83 | 141 | 202 |
| | 60° C. × One week | 129 | 95 | 198 | 183 | 148 | 121 | 138 | 94 | 143 | 221 |
| | Rate of change (%) | -2 | 2 | 2 | 0 | 17 | 19 | 4 | 13 | 1 | 9 |
| Surface tension (mN/m) | Immediately after dispersion | 38.5 | 38.0 | 38.1 | 38.4 | 38.9 | 39.0 | 38.3 | 36.7 | 38.0 | 37.9 |
| | 60° C. × One week | 37.9 | 37.5 | 37.3 | 37.3 | 37.0 | 37.6 | 37.3 | 37.0 | 36.7 | 37.6 |
| | Rate of change (%) | -2 | -1 | -2 | -3 | -5 | -4 | -3 | 1 | -3 | -1 |

TABLE 2

| Component mixing ratio (parts by weight) | | Example | | | | | | | | | |
|---|---|---|---|---|---|---|---|---|---|---|---|
| | | 11 | 12 | 13 | 14 | 15 | 16 | 17 | 18 | 19 | 20 |
| Component (A) | A-1 | 0.05 | 0.05 | | | 0.05 | 0.05 | 0.05 | | 0.05 | 0.05 |
| | A-2 | | | | | | | | 0.3 | | |
| | A-3 | | | 0.3 | 0.3 | | | | | | |
| Component (B) | B-1 | 2.6 | 1.3 | | | | | | | 2.8 | 1.5 |
| | B-2 | | | | | 2.6 | | | | | |
| | B-3 | | | | | | 2.6 | | | | |
| | B-4 | | | | | | | 2.6 | | | |
| | B-5 | | | 2.6 | 2.6 | | | | 2.6 | | |
| Component (C) | C-1 | | | 0.4 | | 0.4 | 0.4 | 0.4 | 0.4 | 0.2 | 1.5 |
| | C-2 | 0.4 | 0.2 | | 0.4 | | | | | | |
| Disperse dye | DR-60 | | | | | | | | | | |
| | DY-54 | | | | | | | | | | |
| | DB-60 | | | | | | | | | | |
| | DB-359 | | | | | | | | | | |
| | DB-360 | 15 | | 15 | 15 | 15 | 15 | 15 | 15 | 15 | 15 |
| | DBr-27 | | 15 | | | | | | | | |
| Aqueous solvent | Water | 81.85 | 83.35 | 81.7 | 81.7 | 81.85 | 81.85 | 81.85 | 81.7 | 81.85 | 81.85 |
| | Dipropylene glycol | 0.1 | 0.1 | | | 0.1 | 0.1 | 0.1 | | 0.1 | 0.1 |
| Viscosity (mPa · s) | Immediately after dispersion | 1.9 | 1.7 | 1.9 | 1.8 | 2.0 | 2.1 | 1.8 | 1.9 | 2.0 | 2.1 |
| | 60° C. × One week | 2.1 | 1.6 | 1.9 | 2.0 | 2.0 | 2.2 | 1.8 | 2.0 | 1.9 | 2.2 |
| | Rate of change (%) | 11 | -6 | 0 | 11 | 0 | 5 | 0 | 5 | -5 | 5 |
| Mean particle size (nm) | Immediately after dispersion | 121 | 90 | 151 | 135 | 146 | 119 | 122 | 134 | 124 | 133 |
| | 60° C. × One week | 146 | 102 | 156 | 147 | 159 | 127 | 136 | 151 | 145 | 149 |
| | Rate of change (%) | 21 | 13 | 3 | 9 | 9 | 7 | 11 | 13 | 17 | 12 |
| Surface tension (mN/m) | Immediately after dispersion | 37.5 | 37.8 | 32.9 | 32.6 | 37.1 | 39.7 | 38.5 | 31.2 | 38.0 | 40.7 |
| | 60° C. × One week | 36.2 | 37.0 | 32.7 | 32.5 | 35.8 | 38.6 | 37.1 | 30.1 | 36.9 | 39.2 |
| | Rate of change (%) | -3 | -2 | -1 | 0 | -4 | -3 | -4 | -4 | -3 | -4 |

TABLE 3

| Component mixing ratio | | Reference | Comparative Example | | | | | |
|---|---|---|---|---|---|---|---|---|
| (parts by weight) | | Example | 1 | 2 | 3 | 4 | 5 | 6 |
| Component (A) | A-1 | 0.05 | 0.05 | 0.05 | 0.05 | 0.05 | 0.05 | 0.05 |
| | A-2 | | | | | | | |
| | A-3 | | | | | | | |
| Component (B) | B-1 | 1.5 | 1.5 | 3.0 | 3.0 | 3.0 | 1.5 | |
| | B-2 | | | | | | | |
| | B-3 | | | | | | | |
| | B-4 | | | | | | | |
| | B-5 | | | | | | | |
| Component (C) | C-1 | | | | | | | 1.5 |
| | C-2 | | | | | | | |
| Disperse dye | DR-60 | 15 | | | | | | 15 |
| | DY-54 | | 15 | | | | | |
| | DB-60 | | | 15 | | | | |
| | DB-359 | | | | 15 | | | |
| | DB-360 | | | | | 15 | | |
| | DBr-27 | | | | | | 15 | |
| Aqueous solvent | Water | 83.35 | 83.35 | 81.85 | 81.85 | 81.85 | 83.35 | 83.35 |
| | Dipropylene glycol | 0.1 | 0.1 | 0.1 | 0.1 | 0.1 | 0.1 | 0.1 |
| Viscosity (mPa · s) | Immediately after dispersion | 1.6 | Unvalued because of separation immediately after dispersion | 1.9 | 3.2 | 1.8 | 1.9 | 1.7 |
| | 60° C. × One week | 1.7 | | 2.7 | 6.6 | 2.4 | 1.6 | 1.6 |
| | Rate of change (%) | 6 | | 42 | 106 | 33 | −16 | −6 |
| Mean particle size (nm) | Immediately after dispersion | 124 | | 117 | 182 | 131 | 87 | 1,631 |
| | 60° C. × One week | 131 | | 210 | 278 | 299 | 123 | 1,997 |
| | Rate of change (%) | 6 | | 79 | 53 | 128 | 41 | 22 |
| Surface tension (mN/m) | Immediately after dispersion | 37.1 | | 35.4 | 37.1 | 36.5 | 37.5 | 48.0 |
| | 60° C. × One week | 36.5 | | 34.9 | 36.5 | 35.8 | 36.6 | 47.7 |
| | Rate of change (%) | −2 | | −1 | −2 | −2 | −2 | 1 |

Japanese Patent Application No. 2018-086534 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A dispersant comprising:
   (A) 0.5 to 30% by weight of a compound selected from at least one of acetylene glycol represented by formula (1):

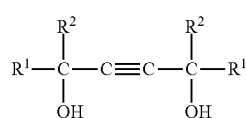

(1)

wherein $R^1$ and $R^2$ each represent a $C_1$-$C_5$ alkyl group, and an ethoxylated substance of acetylene glycol represented by formula (2):

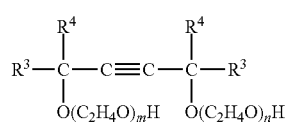

(2)

wherein $R^3$ and $R^4$ each represent a $C_1$-$C_5$ alkyl group, m and n each are a positive number of 0.5 to 25, and m+n is 1 to 40;

(B) 5 to 98% by weight of a nonionic aryl phenol compound represented by formula (3):

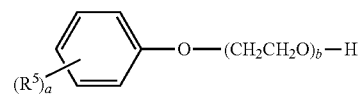

(3)

wherein a is an integer of 1 to 4, b is an integer of 1 to 30, and $R^5$ is an aryl group; and (C) 1 to 70% by weight of an anionic aryl phenol compound represented by formula (4):

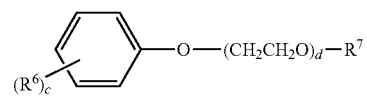

(4)

wherein c is an integer of 1 to 4, d is an integer of 1 to 30, $R^6$ is an aryl group, and $R^7$ is an anionic group, and wherein the total amount of components (A) to (C) is 100% by weight,
   wherein the amount of component (B) is equal to or larger than the amount of component (C).

2. The dispersant according to claim 1, wherein $R^5$ and $R^6$ in formula (3) and formula (4) are a styryl, a benzyl, or a cumyl group.

3. The dispersant according to claim 1, wherein $R^7$ in formula (4) is a phosphate, a sulfonate, or a sulfate.

4. The dispersant according to claim 1, wherein the dispersant is used for dispersing a disperse dye or a pigment in an aqueous solvent.

5. A dispersion comprising a dispersant, a disperse dye and/or a pigment, and an aqueous solvent, wherein the dispersant is the dispersant according to claim 1.

6. An ink composition comprising the dispersion according to claim 5.

7. A method of preparing a dispersion, comprising mixing and dispersing of the dispersant according to claim 1, a disperse dye and/or a pigment, and an aqueous solvent.

8. A method of preparing an ink composition, comprising: mixing and dispersing of the dispersant according to claim 1, a disperse dye and/or a pigment, and an aqueous solvent to obtain a dispersion; and mixing of the dispersion with at least one kind of a substance selected from a group of water, a water-soluble organic solvent, resin, an ultraviolet absorber, an antioxidant, a pH adjuster, a preservative, and a viscosity modifier.

* * * * *